United States Patent [19]
Hirota

[11] Patent Number: 5,430,559
[45] Date of Patent: *Jul. 4, 1995

[54] IMAGE READING APPARATUS WITH IMPROVED OUTPUT CORRECTION OF IMAGE SIGNAL

[75] Inventor: Yoshihiko Hirota, Toyokawa, Japan

[73] Assignee: Minolta Camera Kabushiki Kaisha, Osaka, Japan

[ * ] Notice: The portion of the term of this patent subsequent to Jan. 22, 2002 has been disclaimed.

[21] Appl. No.: 120,854

[22] Filed: Sep. 15, 1993

Related U.S. Application Data

[63] Continuation of Ser. No. 902,792, Jun. 24, 1992, abandoned, which is a continuation of Ser. No. 659,886, Feb. 25, 1991, abandoned, which is a continuation-in-part of Ser. No. 631,934, Dec. 21, 1990, abandoned, which is a continuation of Ser. No. 453,996, Dec. 20, 1989, Pat. No. 4,987,485.

[30] Foreign Application Priority Data

Dec. 22, 1988 [JP] Japan .............................. 63-324265
Dec. 22, 1988 [JP] Japan .............................. 63-324266

[51] Int. Cl.⁶ .................................................. H04N 1/46
[52] U.S. Cl. ...................................... 358/516; 358/523
[58] Field of Search .................. 358/461, 504, 516, 518, 358/523; H04N 1/46, 9/73

[56] References Cited

U.S. PATENT DOCUMENTS

| | | | |
|---|---|---|---|
| 3,800,078 | 3/1974 | Cochran et al. | 178/7.1 |
| 4,037,249 | 7/1977 | Pugsley | 358/76 |
| 4,523,229 | 6/1985 | Kanmoto | 358/163 |
| 4,554,583 | 11/1985 | Saitoh et al. | 358/163 |
| 4,577,218 | 3/1986 | Kurata | 358/75 |
| 4,679,073 | 7/1987 | Hayashi | 358/80 |
| 4,731,661 | 3/1988 | Nagano | 358/75 |
| 4,734,762 | 3/1988 | Aoki et al. | 358/80 |
| 4,806,780 | 2/1989 | Yamamoto et al. | 250/578 |
| 4,821,099 | 4/1989 | Sakamoto | 358/163 |
| 4,833,533 | 5/1989 | Augusti et al. | 358/80 |
| 4,839,722 | 6/1989 | Barry et al. | 358/80 |
| 4,841,360 | 6/1989 | Birgmeir | 358/80 |
| 4,926,254 | 5/1990 | Nakatsuka et al. | 358/76 |
| 4,945,405 | 7/1990 | Hirota | 358/75 |
| 4,987,485 | 1/1991 | Hirota | 358/80 |
| 5,021,877 | 6/1991 | Tsuchiya et al. | 358/75 |
| 5,053,866 | 10/1991 | Johnson | 358/75 |
| 5,140,413 | 8/1992 | Suzuki et al. | 358/80 |

FOREIGN PATENT DOCUMENTS

| | | | |
|---|---|---|---|
| 60-96076 | 5/1985 | Japan | 358/461 |
| 63-26079 | 2/1988 | Japan | H04N 1/40 |

Primary Examiner—Leo H. Boudreau
Assistant Examiner—Andrew W. Johns
Attorney, Agent, or Firm—Burns, Doane, Swecker & Mathis

[57] ABSTRACT

An image reading apparatus in accordance with the present invention reads a color image to separate the image into three primary colors by an image sensor and outputs image data corresponding to each of the colors. This image reading apparatus comprises a scanning device for making the image sensor relatively scan for a reference chart and an original, an A/D converter for converting an output of the image sensor into digital data corresponding to each of the primary colors, an operation device for evaluating correction data of each color from the output of the image sensor generated when the image sensor scans the reference chart, a multiplier for multiplying the digital data of each color by the correction data evaluated, an adder for adding a result of the multiplication and digital data before being multiplied, a shading correction circuit provided at a succeeding stage of the adder, and a line memory provided at a succeeding stage of the shading correction circuit.

12 Claims, 10 Drawing Sheets

IMAGE READING APPARATUS WITH IMPROVED OUTPUT CORRECTION OF IMAGE SIGNAL

This application is a continuation of application Ser. No. 07/902,792, filed Jun. 24, 1992, now abandoned, which is a continuation of application Ser. No. 07/659,886, filed Feb. 25, 1991, now abandoned, which is a continuation-in-part of application Ser. No. 07/631,934, filed Dec. 21, 1990, now abandoned, which is a continuation of application Ser. No. 07/453,996, filed Dec. 20, 1989, now U.S. Pat. No. 4,987,485.

BACKGROUND OF THE INVENTION

Field of the Invention

The present invention relates generally to image reading apparatuses and, more particularly, to an image reading apparatus for carrying out a correction by altering a read image signal to an output signal to obtain a suitable print, particularly a white balance correction and a shading correction.

Description of the Related Art

An image reading apparatus has conventionally been employed as means for inputting an image of a computer or means for reading an original image of a digital type copier. In such an apparatus, a still image such as an original is read by an image sensor, and resultant image data is then subject to various image processings to output an image signal.

As an optical system of such an image reading apparatus, there is provided in general an equal-scale magnification type optical system for shifting one-dimensional image sensor (a line sensor) comprising a light source for illumination, a rod lens for converging a reflected light from the original, CCDs (Charge Coupled Devices) arranged in the direction of main scanning and the like, in the direction of sub-scanning below a platen glass on which the original is set. In an image reading apparatus for reading a color image, a color separating filter is provided for separating three primary colors, i.e., R (red), G (green) and B (blue) on a front face of a photo detecting area corresponding to each pixel of the line sensor.

A photoelectric conversion output of each of the colors transmitted from the line sensor which reads an original image as separated into the three primary colors is appropriately amplified. This photoelectric conversion output is digitized by analog/digital (A/D) conversion means, and image data based on an intensity of a reflected light of each color in each pixel is generated.

The image data is subjected to numerous image processing steps and then transmitted as an image signal to an image forming apparatus such as a printer.

In image processing, normalization of image data, called a white balance correction, is carried out between the image reading apparatus and the image forming apparatus in order to correctly reproduce a tone of an original color image. That is, a reference color (normally white) is determined, and thus the image data is normalized so that a relative ratio of the respective colors (R, G, B) is fixed when the original image with a uniform reference color is read. This normalization enhances a compatibility with various types of image forming apparatuses. Furthermore, this normalization enables a correct tone reproduction even in the cases of a replacement of the line sensor, a dispersion in light receiving sensitivity of the line sensor in mass production of the image reading apparatus, and a change with time in the optical system.

In the conventional image reading apparatus, the white balance correction is carried out at the stage of digitization of the photoelectric conversion output. That is, an analog reference potential to be applied to an A/D converter is adjusted in digitization for each color so that the image data of each color becomes uniform when reading a reference color image.

An A/D converter needs to be provided for each of those primary colors since it is totally impossible to adjust a reference potential for each color in accordance with read scanning of the respective colors to be carried out almost simultaneously, in a fast image reading apparatus. Further, the correction involves analog processing, so that an accuracy in correction is easily affected by an external factor such as temperature.

In automation of the white balance correction by employing a CPU (Central Processing Unit), in particular, it is indispensable to provide a digital/analog (D/A) converter for generating a reference voltage in accordance with data showing a result of arithmetic operation of the CPU, in addition to the A/D converter. Consequently, the configuration of a correction apparatus is complicated.

Further, since a solid image pickup element such as a CCD involves a limitation in size due to the size of a semiconductor wafer, the line sensor comprises a plurality of CCD chips in an image reading apparatus for reading images of A3 and A4 in size. Thus, a line sensor consisting of a 5-chip configuration, for example, requires three sets of A/D converters and D/A converters for each chip, i.e., totally 30 converters (3 colors×5 chips×2 kinds), resulting in a large-scale and expensive apparatus.

Meanwhile, a uniformity of image data, called a shading correction, is effected in order to correct a dispersion in image data due to a sensitivity difference between image pickup elements, a light intensity distribution (an unevenness in quantity of light) of a light source in the main scanning direction, a distortion in a lens and the like. That is, before reading the original, a reference color image with a uniform density is previously read, and reference image data corresponding to one line is stored. Thus the image data is corrected for each pixel in accordance with the reference image data in sending-/receiving an image signal for the original.

FIGS. 1 and 2 are block diagrams showing schematic configurations of shading correction circuits S1 and S2, employed in the conventional image reading apparatuses.

The shading correction circuit S1, shown in FIG. 1, is based on a so-called table index method and comprises an RAM 71 for storing reference image data SD7, and an ROM 72 as a shading correction table in which image data Do7 for correction, previously prepared, is written.

The RAM 71 writes the reference image data SD7 corresponding to one line before reading the original. The RAM 71 outputs the reference image data SD7 which is previously read by the image pickup element in synchronization with inputting of the image data Di7 which is read from an original by the same image pickup element.

Addressing of the ROM 72 is carried out by the image data Di7 and the reference image data SD7, so that the ROM 72 outputs the correction image data Do7 of a designated address.

The shading correction circuit S2, shown in FIG. 2, employs a reciprocal coefficient multiplication method and comprises a RAM 81 for storing reference image data SD8 or reciprocal coefficient data ID8, reciprocal operation means 82 for generating the reciprocal coefficient data ID8 in response to the reference image data SD8, and a multiplier 83 for multiplying image data Di8 and the reciprocal coefficient data ID8.

The RAM 81 stores the reference image data SD8 corresponding to one line before reading the original.

The reciprocal operation means 82 repeats reading out reference image data SD8 corresponding to one pixel stored in one address of the RAM 81, generating reciprocal coefficient data ID8 corresponding to the read-out reference image data SD8 and writing the generated reciprocal coefficient data ID8 into the RAM 81. As described above, the reference image data SD8 is replaced by the reciprocal coefficient data ID8 for the content of the RAM 81.

The reciprocal coefficient data ID8 responds to a number resulting from reciprocal conversion of the reference image data SD8 as a maximal data to 1. The image data Di8 is multiplied by a coefficient by the arithmetic operation of the multiplier 83. That is, correction image data Do8 which is corrected to be in a relative ratio to the maximum data of the reference image data SD8 is outputted.

In accordance with the table index method as shown in the shading correction circuit S1 of FIG. 1, a change in the content of the correction image data Do7 which is previously prepared in the ROM 82 enables setting an arbitrary correction pattern and thus an optimal shading correction for various factors of a dispersion in image data generated between pixels on one line. However, the fast-operated ROM 72 with a large capacity is required therefor.

Assuming that the image data is of 8 bits (256 gradations), for example, since a bit scheme of the reference image data must also be 8 bits to obtain a maximum correction accuracy, the ROM 72 is required to have one address of 16 bits and a capacity of 64 K byte (64 K×8 bits). However, such a ROM integrated circuit device with a large capacity and an access time equal to or less than 50 nsec is not propagated for general purpose. This specially ordered ROM product is considerably expensive, so that an ROM with a capacity of 8 K byte is unintentionally employed at present. The shading correction is carried out in this ROM of 8 K byte by designating one address of 13 bits by image data of 7 bits (128 gradations) and reference image data of 6 bits.

As described above, in the case of employing the table index method, the number of bits of image data is limited by performance of the ROM, so that a transmission of an image signal with a high gradation cannot be realized. Further, when the number of bits of the reference image data is smaller than that of the image data, a correction range is also narrowed. That is, when the number of bits of the reference image data is less than that of the image data by one bit as in the above case, the correction range is limited to the case that the intensity of the image data is larger than half that of the maximum data, while a correction error occurs in the case that the intensity of the image data is smaller than half that of the maximum data.

The reciprocal coefficient multiplication method requires no memory with a large capacity, and is suitable for a normal shading correction in which the intensity of a reflected light is almost proportional to the image data.

However, in the shading correction circuit S2 of FIG. 2, since an operation of reciprocal coefficient data corresponding to pixels by one line is carried out before the transmission of the image signal, a long time period is required from reading a reference color image to inputting the image data for the original image, and thus a rapid transmission of the image signal cannot be carried out. Further, dedicated control means (CPU) for controlling the arithmetic operation of the reciprocal coefficient data and the replacement of the content of the RAM 81 is required, resulting in a correction apparatus with high cost and a complicated configuration. Particularly, in the image reading apparatus for reading a color image, since the arithmetic operation of the reciprocal coefficient data is carried out for each separated color of the three primary colors, a triple arithmetic operation time is required. In order to prevent multiplication of this operation time, three sets of the CPUs are required, resulting in a disadvantage in cost.

SUMMARY OF THE INVENTION

It is an object of the present invention to suitably correct and output an image signal in an image reading apparatus.

It is another object of the present invention to carry out an efficient and economically advantageous image correction in an image reading apparatus.

It is a further object of the present invention to simultaneously carry out a white balance correction and shading correction in an image reading apparatus.

It is still another object of the present invention to carry out an efficient shading correction in an image reading apparatus.

It is a still further object of the present invention to carry out a rapid shading correction in an image reading apparatus.

It is a still further object of the present invention to simultaneously carry out an efficient white balance correction and efficient shading correction in an image reading apparatus.

In order to achieve the above described objects, according to one aspect of the present invention, an image reading apparatus for reading a color image to separate the image into three primary colors by an image sensor and outputting image data corresponding to each of the colors, including: scanning means for making the image sensor relatively scan for a reference chart and an original; A/D conversion means for converting an output of the image sensor into digital data corresponding to each of the three primary colors; operation means for evaluating correction data of each color from the output of the image sensor when the image sensor scans the reference chart; and multiplication means for multiplying digital data of each color by the evaluated correction data when the image sensor scans the original.

In the above constructed image reading apparatus, image data of the original is corrected by the multiplication employing the correction data of each color based on the reference chart upon scanning of the original, thereby enabling an efficient white balance correction.

In order to achieve the above described objects, according to another aspect of the present invention, an image reading apparatus for reading a color image to separate the image into three primary colors by an image sensor and outputting image data corresponding to each of the colors, including: scanning means for making the image sensor relatively scan for a reference chart and an original; storage means for storing respective color images of the reference chart corresponding to one line for each element of the image sensor; reciprocal conversion means for reading the image data from the storage means, converting the read image data into reciprocal data and outputting the reciprocal data; multiplication means for multiplying the image data of the original by the reciprocal data output from the reciprocal conversion means; and correction means for correcting the reciprocal data for respective colors according to the read image data of the reference chart so that the density level of image data for respective colors becomes substantially identical.

In the image reading apparatus thus structured, the reciprocal data of each color is corrected so that the density of the image data of each color with respect to the reference chart corresponding to one line may become substantially identical, thereby simultaneously enabling an efficient white balance correction and efficient shading correction.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An image reader portion IR incorporated in a digital copier will be described as one embodiment of the present invention with reference to the figures.

The digital copier comprises the image reader portion IR as an image reading apparatus, and a laser printer portion LP for forming a color image by an electrophotographic system in accordance with an image signal to be transmitted from the image reader portion IR. The image reader portion IR subjects a pixel signal which is read from an original to various signal processings and then outputs an image signal.

Figure 1:
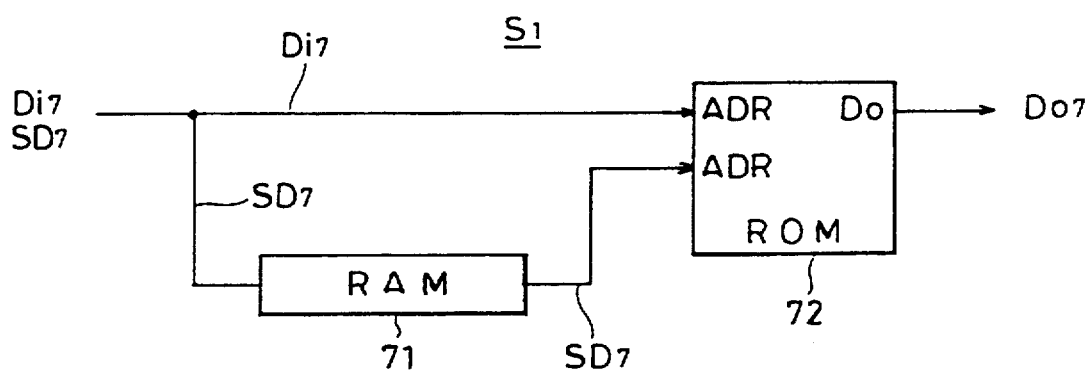
FIG. 1 is a block diagram showing one example of a schematic configuration of a shading correction circuit employed in a conventional image reading apparatus.
Figure 2:
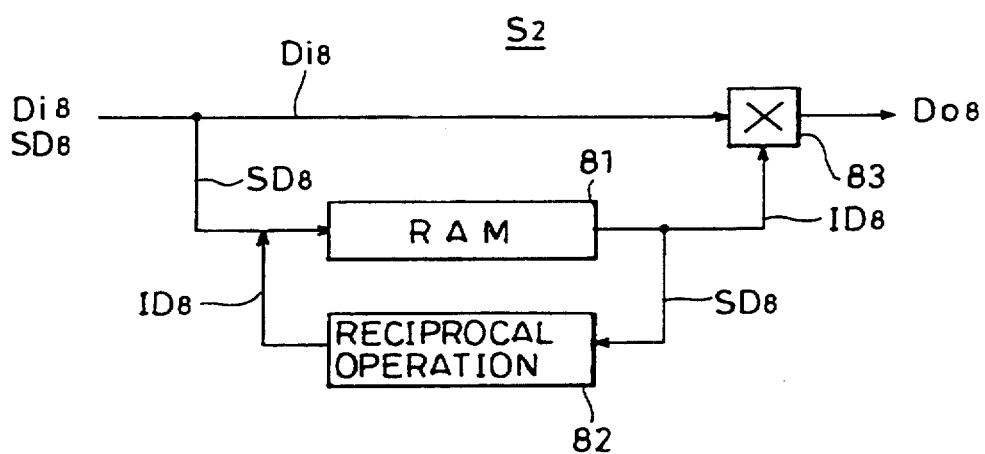
FIG. 2 is a block diagram showing another example of the schematic configuration of the shading correction circuit employed in the conventional image reading apparatus.
Figure 3:
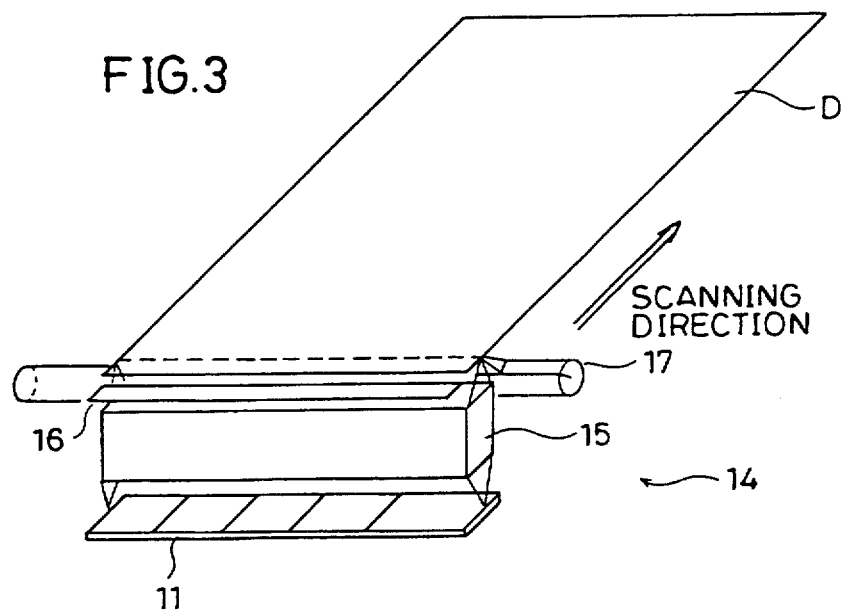
FIG. 3 is a perspective view showing an optical system of an image reader portion in accordance with one embodiment of the present invention.
Figure 4:
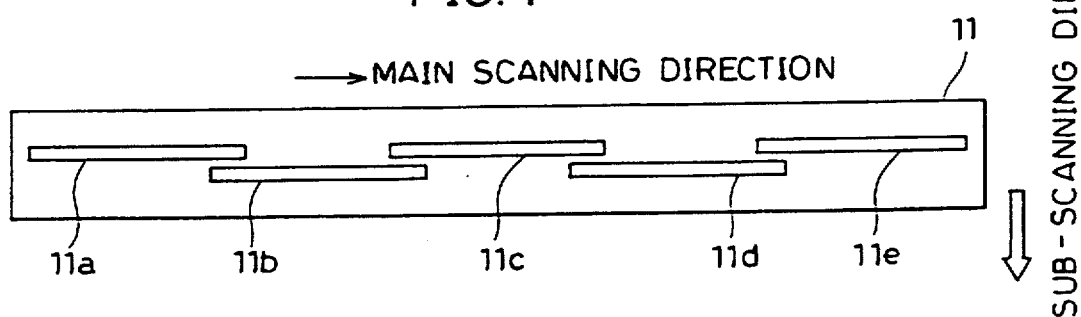
FIG. 4 is a plan view of an image sensor shown in FIG. 3.

FIG. 3 is a perspective view showing an optical system of the image reader portion IR; FIG. 4 is a plan view of an image sensor 11; and FIG. 5 is an enlarged view of a CCD sensor chip 11a of FIG. 4.

As shown in FIG. 3, an original D set on a platen glass (not shown) is line scanned in the sub-scanning direction by a slider 14 comprising an equal-scale magnification type optical system having an exposure lamp 17, a rod lens array 15 and the image sensor 11 which is arranged to output color signals for three primary colors of R (red), G (green) and B (blue). A photoelectric conversion output signal of each of the colors R, G and B is converted into a signal of three colors of Y (yellow), M (magenta) and C (cyan) or four colors including Bk (black) in addition to those three colors by a color correction circuit 105 which will be described later. After undergoing various signal processings, the converted signal is transmitted as an image signal to the laser printer portion LP forming a color image by a deflection scanning of a laser beam.

As shown in FIG. 4, five CCD sensor chips 11a-11e are arranged by a definite spacing apart from each other in a zigzag manner on the image sensor 11 such that those chips are provided sequentially in a horizontal direction (the main scanning direction) and alternately in a vertical direction (the sub-scanning direction). Due to the definite spacing in the sub-scanning direction, an output signal from the rear CCD sensor chips 11a, 11c and 11e in the sub-scanning direction delays in comparison with that from the front CCD sensor chips 11b and 11d; however, this delay is corrected by delaying output signals from the front CCD sensor chips 11b and 11d.

Figure 5:
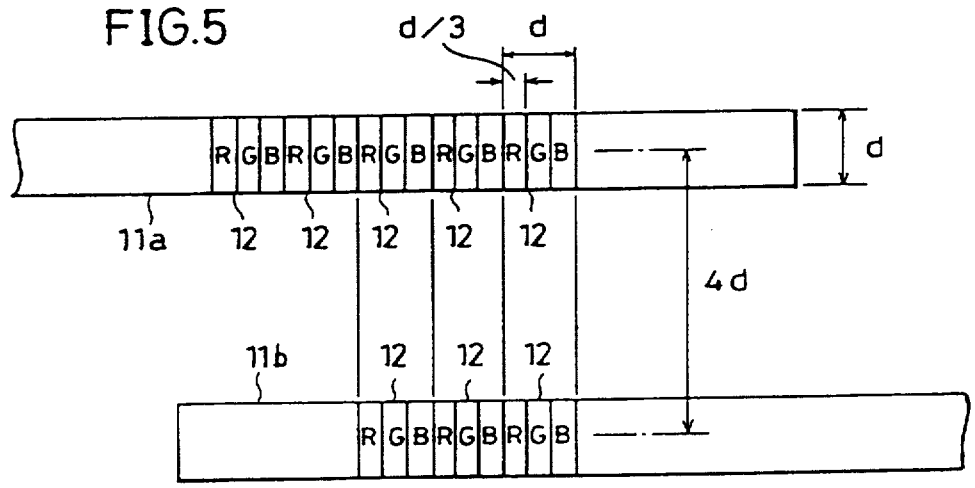
FIG. 5 is an enlarged view of a CCD sensor chip of FIG. 4.

A large number of elements, each of which has a 62.5 $\mu$m (d=1/16 mm) square in size, are arranged in a row in each of the CCD sensor chips 11a-11e, end portions of which are enlarged and shown in FIG. 5.

Each of the elements is divided in triple, and a spectral filter is provided such that each of the divided regions receives light of one color out of the three primary colors of R, G and B.

The one element corresponds to one pixel into which an original image is fractionated, and the photoelectric conversion output of one element represents the intensity of a reflected light of one color of one pixel.

Figure 6:
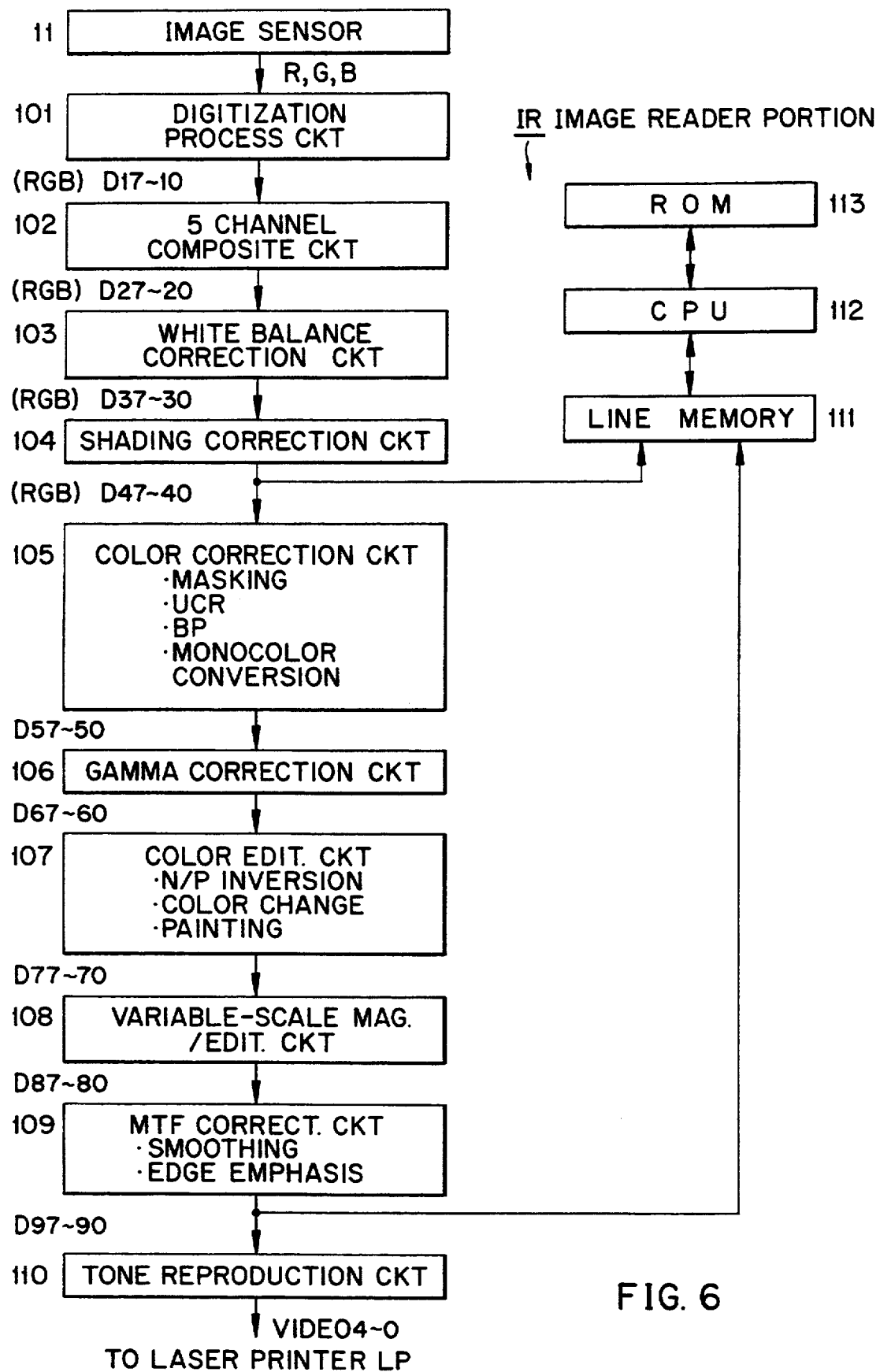
FIG. 6 is a block diagram of an electric circuit of the image reader portion in accordance with one embodiment of the present invention.

FIG. 6 is a block diagram of an electric circuit of the image reader portion IR.

In the image sensor 11, in order to increase reading speed in the main scanning direction, the five CCD sensor chips 11a-11e are simultaneously driven, and effective reading pixel signals corresponding to 2928 pixels in a total of R, G and B are serially outputted from the respective chips.

The photoelectrically converted outputs which are serially outputted from the CCD sensor chips 11a–11e simultaneously (in parallel) are digitized by a digitization processing circuit 101 having a sample and hold circuit and an A/D converter into digital data of 8 bits (256 gradations). This digital data is separated into image data of each color by a latch circuit and is then inputted to a 5 channel composite circuit 102.

The 5 channel composite circuit 102 once stores the image data two lines at a time into FIFO (Fist-In First-Out) memories of 15 (3×5) in total for each chip and each color. The circuit 102 then sequentially selects and reads out the image data from each chip in one line period, and generates a serial image signal corresponding to an arrangement of pixels (the order of read scanning).

The image data of each color to be transmitted as the serial image signal is normalized with a relative ratio of the respective colors adjusted in a white balance correction circuit 103 so that an image with a correct tone can be formed in the laser printer portion. The white balance correction circuit 103 will be described in detail later.

Next, a shading correction circuit 104 adds a correction for the light intensity distribution (unevenness in the quantity of light) of the exposure lamp 17 in the main scanning direction and for a sensitivity difference between any CCD sensor chips 11a–11e. Further, a data signal in proportion to the intensity of a reflected light is converted in logarithm in accordance with a visual characteristic and is then converted into a density data signal in proportion to a density of the original D. This correction circuit 104 will also be described in detail later.

A color correction circuit 105 carries out a masking processing for generating density data corresponding to three primary colors of Y, M and C of a printing toner from density data corresponding to the respective colors of R, G and B, as described above, and a UCR processing for generating density data corresponding to Bk (black). A gamma correction circuit 106 carries out gamma correction in accordance with a basic color and a density gradation of the original D.

A color editing circuit 107 offers processing for three kinds of color image editing i.e., negative/positive inversion, color changing and painting.

A variable-scale magnification/edition processing circuit 108 carries out processings for changing timing of and the order of outputting a density data signal, or scanning speed in the sub-scanning direction in order to form a variable-scale magnified image which is enlarged or reduced in size and an image which is edited by movement or so-called mirror inversion processing, by employing a thinning-out method, an operation method or an interpolation method. An MTF correction circuit 109 carries out smoothing for preventing an occurrence of Moire fringe, and an edge emphasis for eliminating an edge loss.

The density data signals D97-90 subjected to those various signal processings are binary processed by an area tone method in a tone reproduction circuit 110 and then transmitted as video signals VIDEO 4-0 to the laser printer portion LP. A line memory stores image data at a specific processing stage. A CPU (Central Processing Unit) 112 controls each of the circuits described above. An ROM 113 stores a program and various data.

Figure 7:
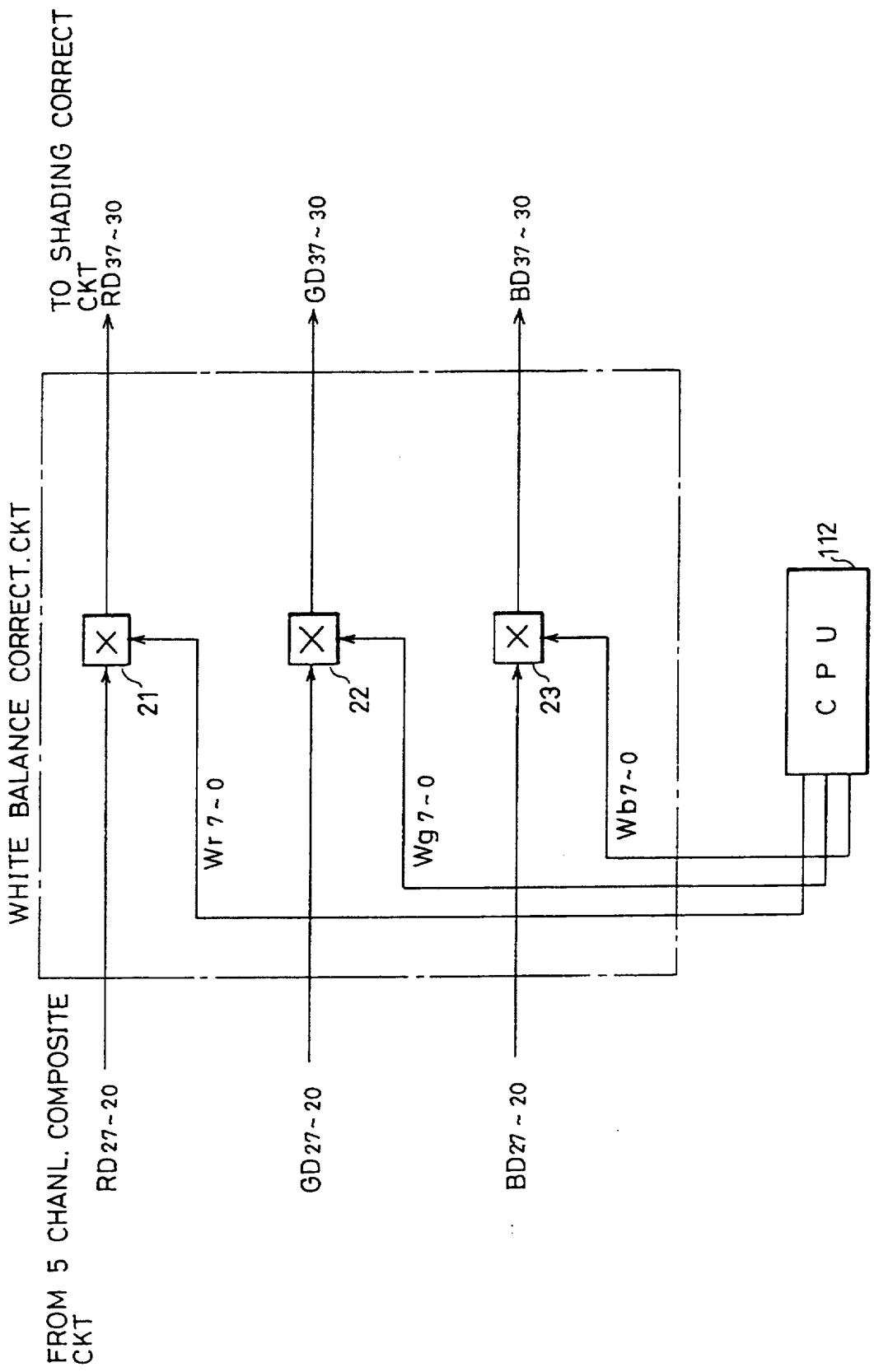
FIG. 7 is a block diagram of a white balance correction circuit in accordance with one embodiment of the present invention.

FIG. 7 is a block diagram of the white balance correction circuit 103 shown in FIG. 6.

The white balance correction circuit 103 carries out correction for image data of the respective colors RD27-20, GD27-20, BD27-20 (of 8 bits respectively) transmitted from the 5 channel composite circuit 102 in accordance with correction coefficient data Wr7-0, Wg7-0, Wb7-0 (of 8 bits respectively) transmitted from the CPU 112, and outputs correction image data RD37-30, GD37-30, BD37-30 (of 8 bits respectively).

This white balance correction circuit 103 comprises multipliers 21–23 to which image data (R, G, B) D27-20 are respectively inputted as a multiplicand, and the correction coefficient data Wr7-0, Wg7-0, Wb7-0 are also inputted as a multiplier.

The correction coefficient data Wr7-0, Wg7-0, Wb7-0 represent a decimal of 8 digits in which a decimal point is placed between the most significant bit and the second significant bit. That is, radical numbers $2^0$, $2^{-1}, 2^{-2} \ldots 2^{-7}$ are assigned sequentially from the most significant bit, so that the data are treated as decimal data the value of which varies 1/128 ($2^{-7}$) by 1/128.

Figure 8:
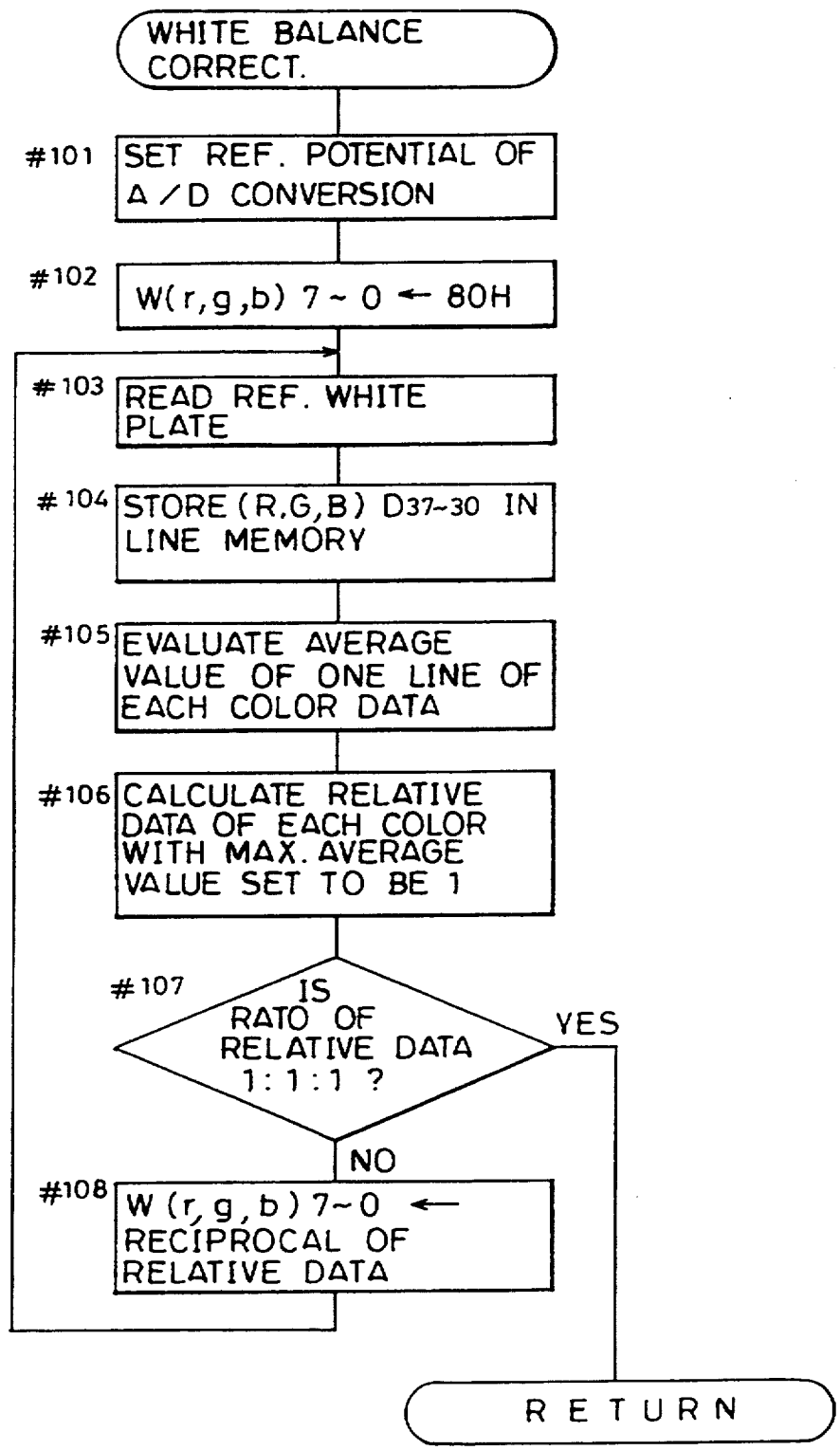
FIG. 8 is a flow chart showing the content of processing of the white balance correction circuit shown in FIG. 7.

FIG. 8 is a flow chart of the white balance correction controlled by the CPU 112.

This processing can optionally be effected in consideration for a change of the optical system with time, but is usually carried out before the scanning of the original D starts.

First, in the step #101, a reference potential of the A/D converter of the digitization processing circuit 101 is set, and an adjustment in level between the CCD sensor chips 11a–11e is carried out.

In the step #102, 80H (an integer 1) is set as the correction coefficient data Wr7-0, Wg7-0, Wb7-0. Accordingly, the multiplier data becomes 1, and the image data (R, G, B) D27-20 are outputted as the correction image data (R, G, B) D37-30 from the adders 41–43.

Next, in the step #103, the exposure lamp 17 is lit at a standby position of the slider 14, and the CCD sensor chips 11a–11e read a reference white plate 16 (referred to FIG. 3) with a uniform density provided at end portions of the platen glass. Ideally, when a reference white image is read, the image data of the three primary colors are equal to each other. In actual practice, however, a difference occurs between the respective image data of the R, G and B due to a spectral sensitivity of the CCD sensor chips 11a–11e and the like.

Therefore, in this embodiment, an evaluation processing is carried out on the correction coefficient data Wr7-0, Wg7-0 Wb7-0 in the following steps #104–108 for a normalization with a ratio of the R, G and B to be 1:1:1.

In the step #104, the correction image data (R, G, B) D37-30 which are outputted substantially kept incorrect as described above, are stored in the line memory 111 one by one line through the shading correction circuit 4. At this time, the shading correction circuit 104 carries out no correction, but controls the inputted correction image data (R, G, B) D37-30 so as to pass the data as they are.

Next, an average value in one line is evaluated for each color, in the step #105. In the step #106, relative data of each color is evaluated, assuming that a largest one of the three average values is "1". In the step #107, it is decided whether or not a ratio of the respective relative data is 1:1:1. If the ratio is determined as 1:1:1 in the step #107, it means that a normalization is completed, so that the procedure returns to a main routine on which other image processings and an operation of each portion of the digital copier are controlled. On the other hand, if the ratio is not determined as 1:1:1, the procedure goes on to the step #108.

In the step #108, a reciprocal of the relative data for each color is set as the correction coefficient data Wr7-0, Wg7-0, Wb7-0, then returning to the step #103.

Assuming that the respective values of the relative data of the R, G and B are 1, 0.95, and 0.65, for example, 1/1 as the correction coefficient data Wr7-0, 1/0.95 (=100/95) as the data Wg7-0, and 1/0.65 (100/65) as the data Wb7-0 are set, respectively.

Here, when the reference white plate 16 is read again in the step #103, the image data identical to the previous one, i.e., the data (R, G, B) D37-30 in which the relative data are the respective values of 1, 95/100 and 65/100, are inputted to the white balance circuit 103.

The multiplier 22 for the data of G multiplies 100/95 times, and consequently outputs correction image data GD37-30 of 100/100.

Similarly, the multiplication is also carried out for the data of B and outputs correction image data BD37-30 equal to correction image data RD37-30 for the data of R.

Therefore, the ratio of the correction image data (R, G, B) D37-30 of the respective colors, which correspond to the image data (R, G, B) D27-20 reading the reference white plate, is 1:1:1, resulting in a completion of the white balance correction.

When reading the original D thereafter, the white balance correction circuit 103 corrects image data inputted from the preceding stage and transmits the corrected data to an image processing circuit at the succeeding stage by performing an arithmetic operation in accordance with the set correction efficient data Wr7-0, Wg7-0, Wb7-0.

According to the above described embodiment, since other image data is matched to the maximum one of the correction image data (R, G, B) D37-30 of the respective colors inputted, a dynamic range set at the preceding stage is not deteriorated.

In addition, the evaluation of the correction coefficient data Wr7-0, Wg7-0, Wb7-0 is carried out based on an average value by one line of the image data (R, G, B) D27-20 of each color in order to enhance a reliability in connection. In case that there is a slight dispersion in characteristics between the CCD sensor chips 11a–11e or between the elements, however, the correction coefficient data Wr7-0, Wg7-0 Wb7-0 may be evaluated based on the image data (R, G, B) D27-20 by 1/5 line or one pixel.

Further, in the above embodiment, a normalization is carried out such that the ratio of the correction image data of each color is 1:1:1. However, it is possible to appropriately determine with the same configuration a convenience of the image processing at the succeeding stage and of the processing in the image forming apparatus, or the ratio of the respective data in accordance with a color of an image to be a reference.

In accordance with the present invention, after an output of the one-dimensional image sensor, which reads the original image to separate it into three primary colors is digitized, a normalization with respect to a tone is carried out for image data corresponding to each color by a digital operation. Therefore, A/D conversion means need not be provided for each color, resulting in a simplified configuration and further a stable correction accuracy due to digital processing.

Figure 9:
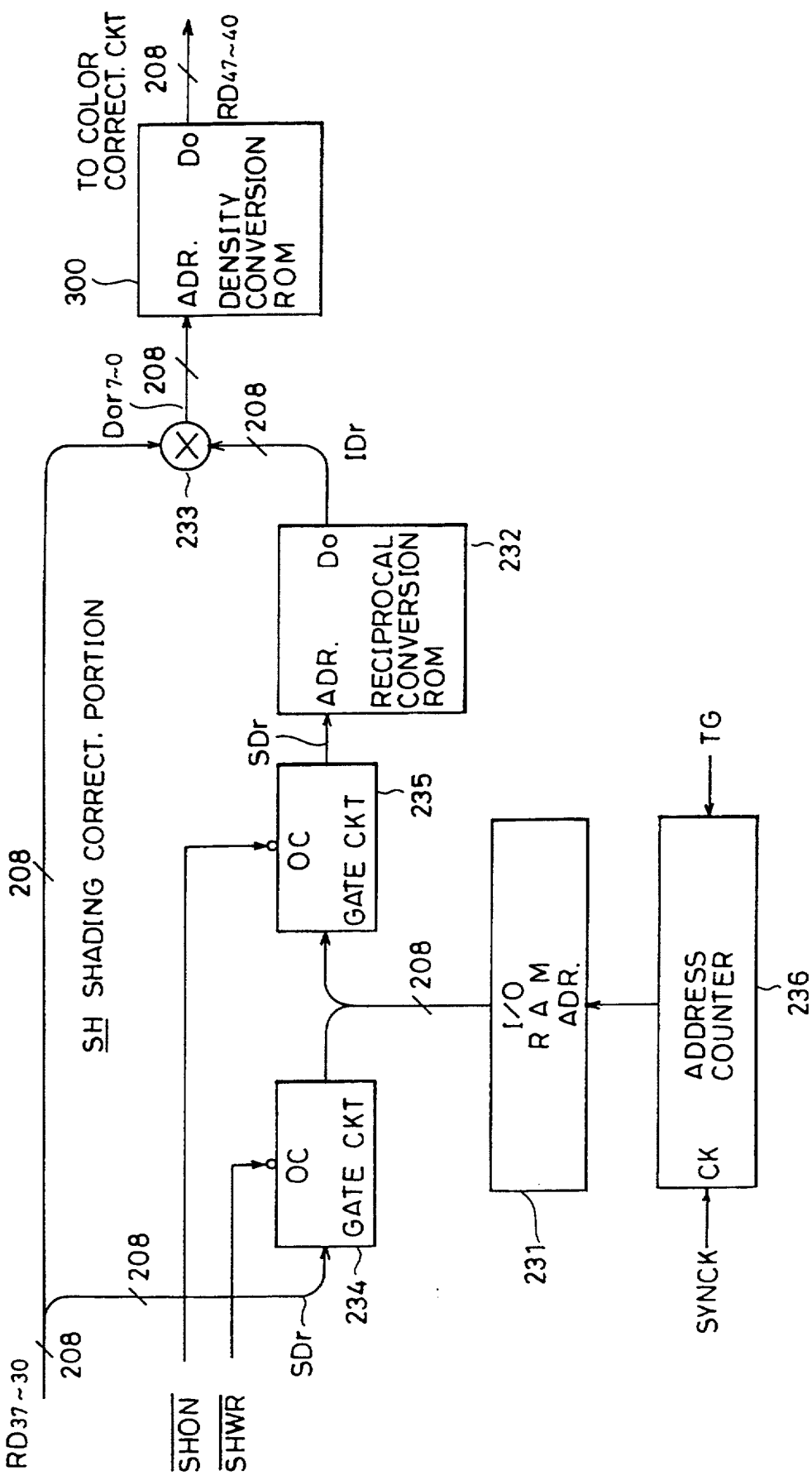
FIG. 9 is a block diagram of a shading correction circuit in accordance with one embodiment of the present invention.

FIG. 9 is a block diagram of the shading correction circuit 104 in accordance with one embodiment of the present invention.

The shading correction circuit 104 comprises a shading correction portion SH provided for each of the respective three primary colors from the white balance correction circuit 103, and a density conversion ROM 300. FIG. 9 shows only a portion with respect to the image data RD37-30 since each of the three primary colors has the same circuit configuration.

This shading correction portion SH comprises an RAM 231 for storing through a gate circuit 234 reference image data SDr corresponding to one line, which are read from the reference white plate 16 (referred to FIG. 3) as a reference color image, a reciprocal conversion ROM 232 for outputting through a gate circuit 235 reciprocal data IDr of the reference image data SDr read from the RAM 231, and a multiplier 233 for multiplying the image data RD37-30, which are read from the original image, and the reciprocal data IDr together.

The RAM 231 with a capacity of 8 K byte can store the reference image data SDr corresponding to one line (8000 pixels) in the main scanning direction. However, since the data writing and reading are carried out through a common input/output port, the gate circuits 234 and 235 are provided for avoiding a collision of input/output data. Addressing for the RAM 231 is incremented in accordance with an image clock signal SYNCK and is carried out by an address counter 236 for carrying out initialization in accordance with a horizontal synchronization signal TG defining one line period. The image clock signal SYNCK is to be a reference of timing to transmit image data between any image processing circuits described above.

When a power is supplied to the image reader portion IR, the exposure lamp 17 is immediately lit at a standby position of the slider 14 (referred to FIG. 3), and then the reference white plate 16 with a uniform density, provided at the end portions of the platen glass, is read. At the same time, a write control enable signal $\overline{\text{SHWR}}$ to be applied from the CPU 112 becomes active (active low), so that read reference image data DS corresponding to one line is stored one by one pixel in turn from a heading address of the RAM 231 in a sequence of arranged pixels, resulting in a completion of a preparation for transmitting an image signal, i.e., a completion of a preparation for shading correction.

In reading the original D, the signal $\overline{\text{SHWR}}$ becomes inactive, and instead a shading correction enable signal $\overline{\text{SHON}}$ becomes active, so that the reference image data SDr is read in turn from the heading address of the RAM 231 in synchronization with an input of the image data RD37-30 from the preceding stage in accordance with the signal SYNCK.

In A/D conversion in the described digitization processing circuit 101, a maximal value of a photoelectric conversion signal from the element 12 is adjusted to be 255 (11111111 B). Thus, the reference image data SDr, which are read from a reference white image, ideally all attain the value 255; however, in actual practice, some of the reference image data SDr attain the signal value equal to or less than 254 due to a light intensity distribution of the exposure lamp 17, a spectral sensitivity of the element 12 and the like, resulting in a difference between any pixels.

Therefore, in this embodiment, reciprocal data IDr are previously prepared in the reciprocal conversion ROM 232 for all the values which the reference image data SDr can obtain, in order to eliminate a difference between any conversion ROM 232 with a capacity of 256 byte, the reference image data SDr read from the RAM 231 addresses, so that reciprocal data IDr of the designated address is read out.

The reciprocal data IDr of 8 bits is a decimal of 8 digits in which a decimal point is placed between the most significant bit and the second significant bit and to which radical numbers $2^0, 2^{-1}, 2^{-2} \ldots 2^{-7}$ are sequentially assigned from the most significant bit. The reciprocal data IDr corresponds to a decimal of 1 (1000 0000 B) to 255/128 (1111 1111 B) out of decimals of 255/255 to 255/128, with its value varying 1/128 ($2^{-7}$) by 1/128 which can be displayed by a total sum of the numerals assigned to the respective bits.

That is, the reference image data SDr of 128 to 255 corresponds to reciprocal values made by conversion of the maximum data 255 as 1, and the reference image data SDr of a signal value equal to or less than 127 correspond to 255/128 identical with the signal value 128; i.e., a signal value 255 of the reference image data SDr corresponds to 255/255 (=1), the value 200 corresponds to 255/200, and the value 128 corresponds to 255/128.

The multiplier 233 carries out multiplication of the image data RD37-30 read at the same element 12 and the reciprocal data IDr corresponding to the reference image data SDr. Therefore, the image data RD37-30 read by the element 12, in which a signal value of the reference image data SDr is equal to or more than 128 when reading the reference white plate 16, are multiplied by the reciprocal data IDr and then outputted from the shading correction portion SH as correction image data Dor7-0 subjected to an accurate shading correction. When the signal value of the image data RD37-30 read by the element 12, in which the signal value of the reference image data SDr is 200, is 150, for example, a multiplication of 150×(255/200) is carried out, and consequently a signal value to be outputted is corrected to 204.

Pixels, in which the reference image data SDr is equal to or lower than 127 when reading the reference white plate 16, are each uniformly almost doubled and outputted.

The correction image data Dor7-0 outputted as above are inputted to the density conversion ROM 300 and then added as a density conversion table index address to the density conversion ROM 300. Logarithm conversion data RD47-40 corresponding to values of the correction image data Dor7-0 are read out from the density conversion ROM 300 and then transmitted as density data in proportion to a density of the original D to the color correction circuit 105 at the succeeding stage.

While the address counter 236 for addressing the RAM 231 may be provided for each color of the three primary colors in the above described embodiment, one address counter may address each other when input-/output of the image data of the respective colors are synchronized with one another.

In accordance with the present invention, a memory device with high speed and a large capacity is not necessary because the present invention is not based on the table index method. Further, a rapid shading correction can be carried out because reciprocal data to be a correction coefficient is generated while reading the reference image data which read a reference color image.

A second embodiment of the present invention will now be described. While the white balance correction and the shading correction are carried out in the different circuits in the first embodiment of the present invention, those corrections are carried out in a single circuit in the second embodiment. A fundamental concept of the second embodiment is that data for shading correction is provided for each color of R, G and B.

Figure 10:
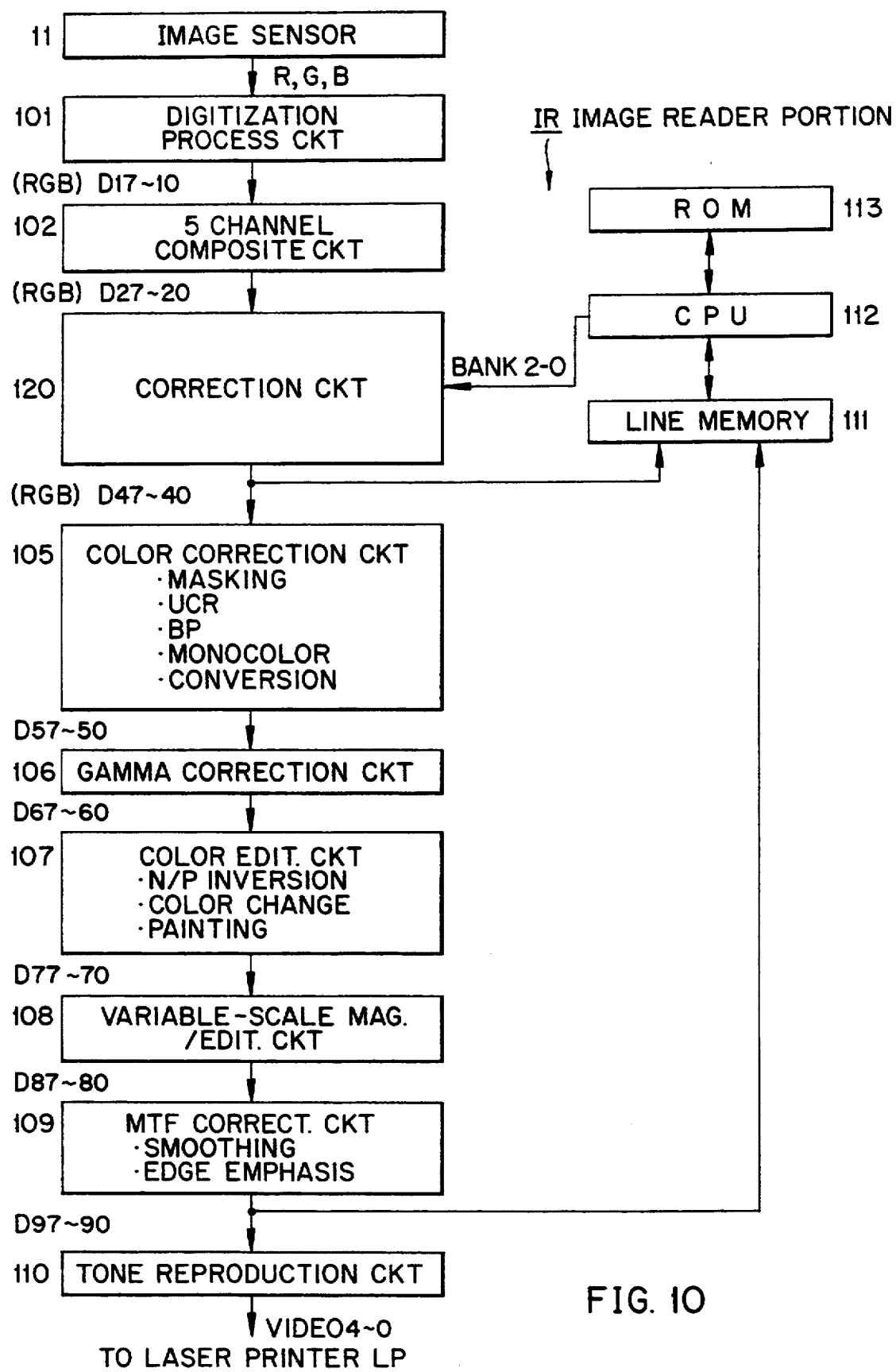
FIG. 10 is a block diagram of an electric circuit of an image reader portion according to a second embodiment of the present invention.

FIG. 10 is a block diagram corresponding to FIG. 6 of the first embodiment. FIG. 10 is different from FIG. 6 in that white balance correction circuit 103 and shading correction circuit 104 are united in a correction circuit 120 in which a white balance correction and shading correction are simultaneously carried out. Correction circuit 120 responds to image data RD27-20, GD27-20 and BD27-20 applied from 5-channel composite circuit 102 and signals BANK2-0 applied from CPU 112 to supply as an output image data RD47-40, GD47-40 and BD47-40 subjected to the white balance correction and shading correction to color correction circuit 105. Since the circuit configurations preceding to and subsequent to correction circuit 120 is the same as those of the first embodiment, a description thereof will not be repeated, and correction circuit 120 will be described with reference to FIG. 11. Although the circuit of FIG. 11 is provided for each color of R, G and B like the first embodiment, only the part corresponding to image data RD27-20 is illustrated here.

Figure 11:
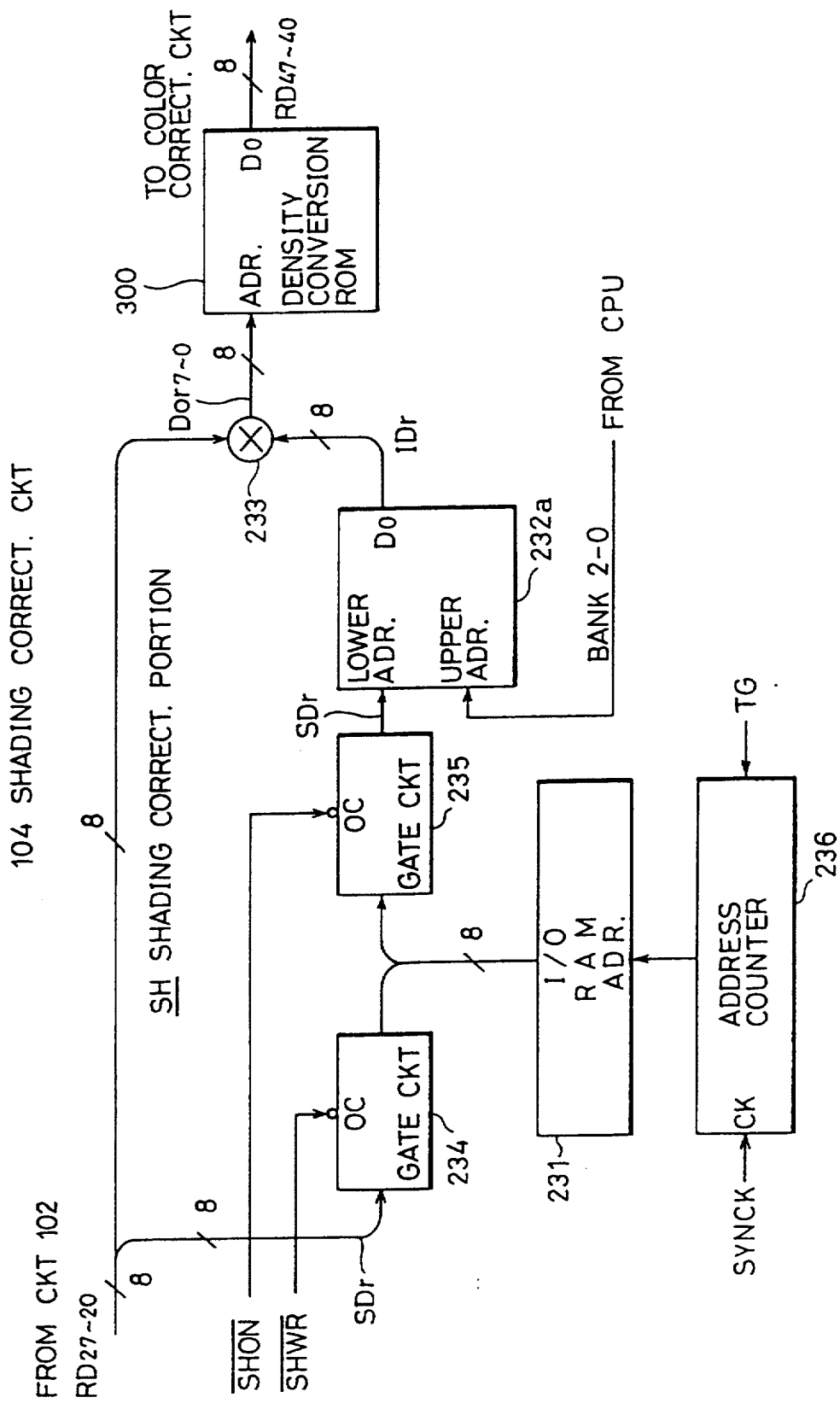
FIG. 11 is a block diagram of a shading correction circuit according to the second embodiment of the present invention.

Referring to FIG. 11, correction circuit 120 includes an RAM 231 for storing reference image data DSr corresponding to one line for reading a reference white plate 16, gate circuits 234 and 235 for supplying data to and from RAM 231, a reciprocal conversion ROM 232a for outputting reciprocal data IDr of reference image data SDr read from RAM 231, a multiplier 233 for multiplying image data RD27-20 and reciprocal data Idr, and a density conversion ROM 300. The respective configurations of RAM 231, gate circuits 234 and 235, multiplier 233 and density conversion ROM 300 are the same as those in the first embodiment.

Reciprocal conversion ROM 232a is constituted by 8 banks, each of which is selected in response to signals BANK2-0 applied from a CPU to an upper address terminal. A signal SDr applied from gate circuit 235 is input through a lower address terminal of ROM 232a. ROM 232a stores the data shown in the table below in each bank.

TABLE

| BANK | IDr |
|------|--------|
| 0 | 220/SDr |
| 1 | 225/SDr |
| 2 | 230/SDr |
| 3 | 235/SDr |
| 4 | 240/SDr |
| 5 | 245/SDr |
| 6 | 250/SDr |
| 7 | 255/SDr |

In the above table, SDr is a value which can be obtained by the signal SDr from gate circuit 235; however, the value ranges from 255 to 128 in practice. Thus, if the signal SDr is the value lower than or equal to 127, the value is replaced by 128 to be output. Therefore, for example, if the bank is 0, reciprocal data IDr ranging from 220/255 to 220/128 are output in correspondence with the signal SDr. If the bank is 2, reciprocal data IDr ranging from 230/255 to 230/128 are output in correspondence with the signal SDr.

Figure 12:
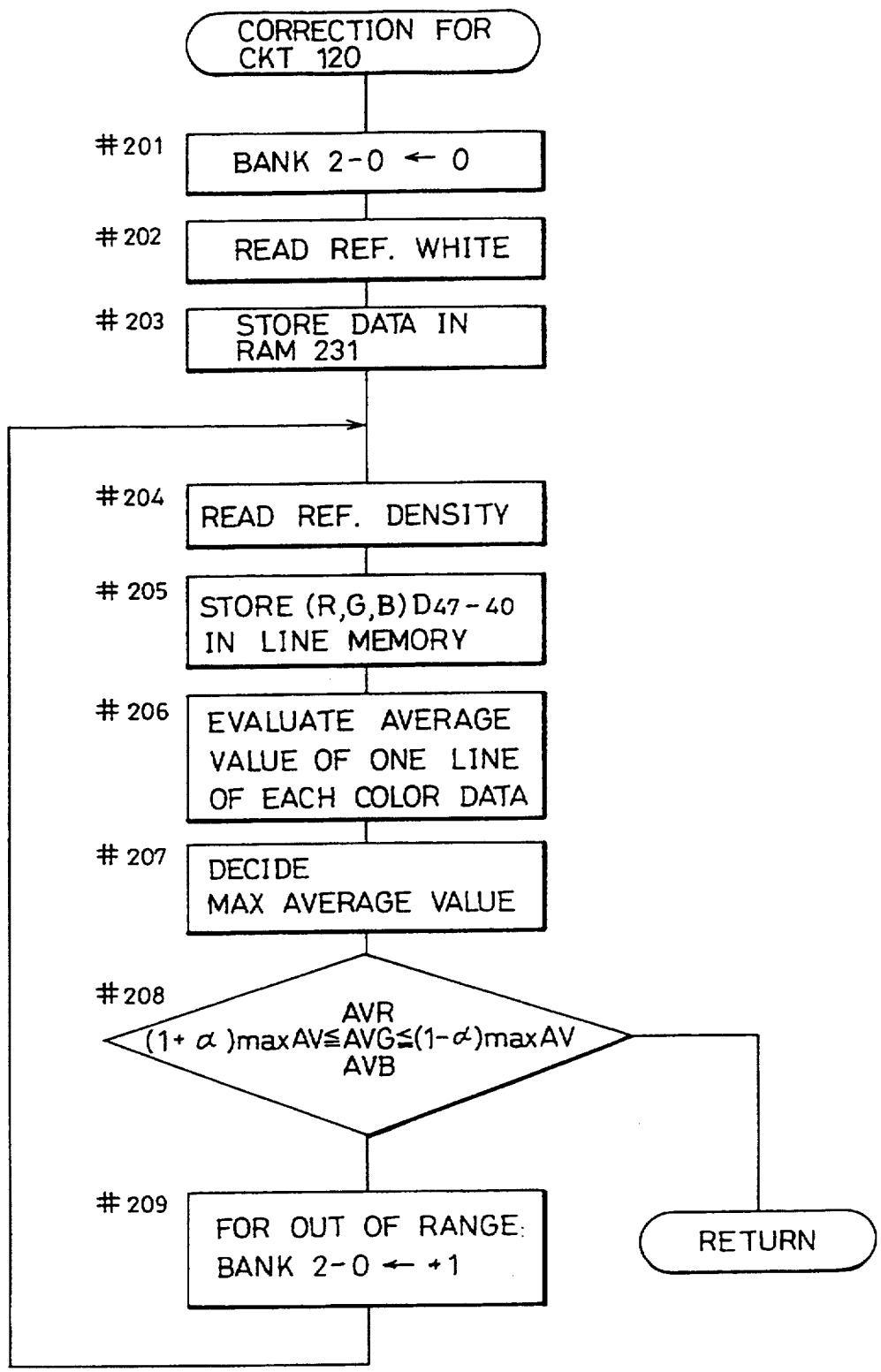
FIG. 12 is a flow chart for illustrating a processing of a correction circuit shown in FIG. 10.

FIG. 12 is a subroutine illustrating a control provided when the CPU carries out corrections relating to correction circuit 120. When this subroutine starts, the signals BANK2-0 with respect to respective colors R, G and B are first set to "0" in step #201.

Next, in step #202, reference white plate 16 placed at one end of the platen is read. In step #203, the read data is stored as reference image data into RAM 231.

Figure 13:
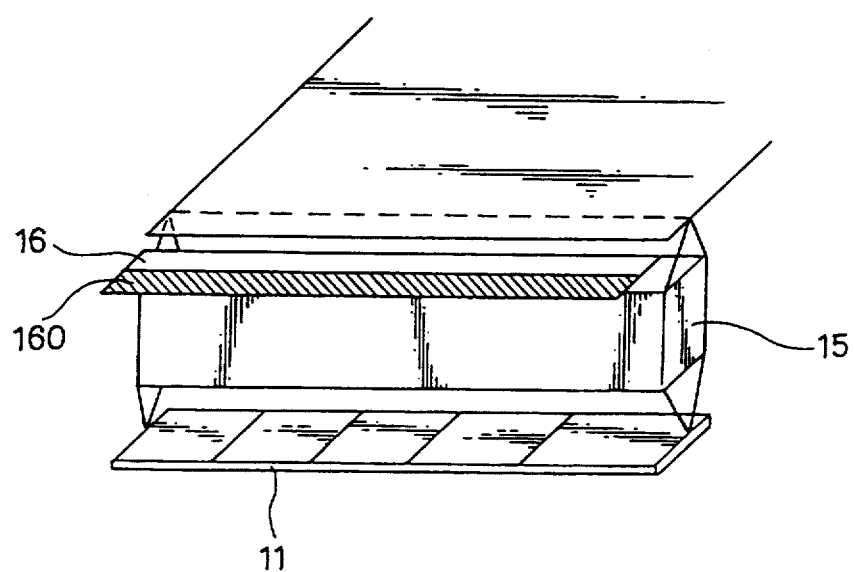
FIG. 13 is a perspective view of a reference plate employed in the second embodiment of the present invention.

In subsequent step #204, a reference density plate 160 provided adjacent to reference white plate 16 is read as shown in FIG. 13. An uncolored plate having a reflection density of approximately 50% is suitable for reference density plate 160; however, reference density plate 160 can also serve as reference white plate 16.

In step #205, image data RD47-40, GD47-40 and BD47-40 with respect to reference density plate 160 of each color, which is subjected to a shading correction in the state that a bank signal is "0", are stored in a line memory 111. In step #206, each of mean values AVR, AVG and AVB, corresponding to one line of each color, is obtained. The maximal mean value maxAV of these mean values is then determined in step #207.

In subsequent step #208, a determination is made as to whether or not the mean values of the respective colors are within the range from the maximal mean value maxAV to predetermined values, that is, whether or not the following relations are satisfied.

$$(1+\alpha)maxAV \leq AVR \leq (1-\alpha)maxAV$$

$$(1+\alpha)maxAV \leq AVG \leq (1-\alpha)maxAV$$

$$(1+\alpha)maxAV \leq AVB \leq (1-\alpha)maxAV$$

where $\alpha$ is a predetermined positive coefficient lower than 1. If all the colors satisfy the above conditions by the determination in step #208, the flow returns to a main routine. If the mean value of a certain color does not satisfy the above conditions, the signal BANK2-0 of that color is counted up by "1" in step #209, and the flow returns to step #204. Then, the processings in steps #204 -#209 are repeated. When all the colors are set in the range as described above, a preparation for correction is made.

The processings in steps #204-#209 alter data of shading correction for each color. This alteration is made so that the data of each color attains substantially the same level with respect to a certain reference density, i.e., the data of each color becomes suitable for the foregoing conditions. Accordingly, the white balance correction and the shading correction can simultaneously be carried out with only respect to the data of reciprocal conversion ROM 232a.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus for reading a color image to separate the image into three primary colors R, G, and B by an image sensor and outputting image data corresponding to each of the colors, comprising:

scanning means for making the image sensor scan a reference chart to produce reference chart signals, and thereafter scan an original;

A/D conversion means for converting an output of said image sensor into digital data corresponding to each of the three primary colors R, G, and B;

operation means for evaluating correction data of said each color from said reference chart signals, said correction data to be used to normalize a ratio of the three primary colors R, G, and B relative to one another; and multiplication means for multiplying digital data of said each color of the original by said evaluated correction data after said A/D conversion means converts said output into digital data.

2. An image reading apparatus as claimed in claim 1, wherein said reference chart has white color.

3. An image reading apparatus as claimed in claim 1, wherein said operation means evaluates relative data between any said respective colors of the output of said image sensor for said reference chart, and evaluates correction data of said respective colors from a reciprocal of said relative data.

4. An image reading apparatus as claimed in claim 1, wherein said operation means and said multiplication means correct color balance in said image signal.

5. An image reading apparatus for reading a color image to separate the image into three primary colors R, G and B by an image sensor having plural elements and outputting image signals corresponding to each of the colors, comprising:

scanning means for making the image sensor scan a reference chart to produce respective reference color image signals of the reference chart corresponding to one line for each element of said image sensor, and thereafter scan an original to produce original R, G, and B image signals;

storage means for storing said respective reference color image signals of the reference chart corresponding to one line for each element of said image sensor:

reciprocal conversion means for reading the reference color image signals from said storage means, converting the read reference color image signals into reciprocal data to be used to normalize a relative ratio of the outputs of the elements and outputting the reciprocal data;

multiplication means for multiplying the original R, G, and B image signals by the reciprocal data outputted from said reciprocal conversion means; and correction means for correcting the reciprocal data for respective colors according to the read reference color image signals to normalize a ratio of the three primary colors R, G, and B relative to one another.

6. An image reading apparatus as claimed in claim 5, wherein said reciprocal conversion means includes a memory storing plural sets of the reciprocal data therein, and said correction means establishes an adequate set of the reciprocal data for respective colors.

7. An image reading apparatus as claimed in claim 6, wherein said correction means establishes the adequate set of the reciprocal data in accordance with respective color image data of one line for the reference chart.

8. An image reading apparatus as claimed in claim 5, further comprising an A/D conversion means for converting an output of said scanning means into digital data prior to correction of color balance.

9. An image reading apparatus for reading a color image to separate the image into three primary colors R, G, and B by an image sensor having plural elements and outputting image signals corresponding to each of the colors, comprising:

- a reference white chart provided at an end portion of a platen for an original;
- a reference density chart having uniform density and provided in the neighborhood of the reference white chart;
- scanning means for making the image sensor scan both reference charts to produce respective white reference color image signals of the reference white chart corresponding to one line for each element of said image sensor, respective density reference color image signals, and thereafter scan the original to produce original R, G, and B image signals;
- storage means for storing said respective white reference color image signals of the reference white chart corresponding to one line for each element of said image sensor;
- reciprocal conversion means for reading the white reference color image signals from said storage means, converting the read white reference color image signals into reciprocal data to be used to normalize a ratio of the outputs of the elements relative to one another and outputting the reciprocal data;
- multiplication means for multiplying the original R, G, and B image signals by the reciprocal data outputted from said reciprocal conversion means; and
- correction means for correcting the reciprocal data for respective colors according to the respective density reference color image signals so that a ratio of the three primary colors R, G, and B is normalized.

10. An image reading apparatus as claimed in claim 9, wherein said reciprocal conversion means includes a memory storing plural sets of the reciprocal data therein, and said correction means establishes an adequate set of the reciprocal data for respective colors.

11. An image reading apparatus as claimed in claim 10, wherein said correction means establishes the adequate set of the reciprocal data in accordance with the respective color image data of the reference density chart.

12. An image reading apparatus as claimed in claim 9, further comprising an A/D conversion means for converting an output of said scanning means into digital data prior to correction of color balance.

* * * * *

UNITED STATES PATENT AND TRADEMARK OFFICE
CERTIFICATE OF CORRECTION

PATENT NO. : 5,430,559
DATED : July 4, 1995
INVENTOR(S) : Yoshihiko HIROTA

It is certified that error appears in the above-indentified patent and that said Letters Patent is hereby corrected as shown below:

Title page column 1, line 7, delete "Jan. 22, 2002" and insert --May 23, 2008--.

On the title page, item [*] notice, should read --
The term of this patent shall not extend beyond the expiration date of patent no. 4,945,405--.

Signed and Sealed this

Seventh Day of November, 1995

Attest:

BRUCE LEHMAN

Attesting Officer

Commissioner of Patents and Trademarks